US012634829B2

(12) United States Patent
Link, II

(10) Patent No.: US 12,634,829 B2
(45) Date of Patent: May 19, 2026

(54) AUTOMATICALLY CHANGING MESSAGE TRANSMISSION MODES IN A TRACKING DEVICE

(71) Applicant: M2MD Technologies, Inc., Atlanta, GA (US)

(72) Inventor: Charles M. Link, II, Atlanta, GA (US)

(73) Assignee: M2MD Technologies, Inc., Atlanta, GA (US)

( * ) Notice: Subject to any disclaimer, the term of this patent is extended or adjusted under 35 U.S.C. 154(b) by 715 days.

(21) Appl. No.: 18/079,458

(22) Filed: Dec. 12, 2022

(65) Prior Publication Data

US 2023/0189156 A1    Jun. 15, 2023

Related U.S. Application Data

(60) Provisional application No. 63/289,095, filed on Dec. 13, 2021.

(51) Int. Cl.
*H04W 52/02* (2009.01)

(52) U.S. Cl.
CPC ... *H04W 52/0277* (2013.01); *H04W 52/0264* (2013.01)

(58) Field of Classification Search
None
See application file for complete search history.

(56) References Cited

U.S. PATENT DOCUMENTS

| | | | | |
|---|---|---|---|---|
| 2006/0217152 A1* | 9/2006 | Fok | | H01M 10/48 455/557 |
| 2011/0243046 A1* | 10/2011 | Huang | | H04W 52/0209 370/336 |
| 2012/0161958 A1* | 6/2012 | Turon | | G01S 19/34 340/539.3 |
| 2013/0005264 A1* | 1/2013 | Sakata | | H04W 52/0229 455/41.2 |
| 2014/0274031 A1* | 9/2014 | Menendez | | H04W 4/029 455/552.1 |
| 2016/0241999 A1* | 8/2016 | Chin | | G07C 9/00182 |
| 2016/0321897 A1* | 11/2016 | Lee | | H04W 4/02 |
| 2017/0006615 A1* | 1/2017 | Wietfeldt | | H04W 88/10 |
| 2020/0029278 A1* | 1/2020 | Mallat | | H04W 4/80 |

FOREIGN PATENT DOCUMENTS

| | | | | | |
|---|---|---|---|---|---|
| CN | 201229603 Y | * | 4/2009 | | |
| CN | 107592628 B | * | 11/2020 | | |
| EP | 3598600 A1 | * | 1/2020 | ........ | H01M 10/4207 |

* cited by examiner

*Primary Examiner* — Mohammed Rachedine
(74) *Attorney, Agent, or Firm* — John L. Doughty; Doughty Law, L.L.C.

(57) ABSTRACT

A tracking device is configured to monitor a parameter, such as battery state or cellular network signal strength, and cause a component of the tracking device to enter a sleep state when a monitored parameter value satisfies a sleep state criterion. Before entering a sleep state, which may comprise a long-range wireless transceiver being turned off, one or more final messages may be emitted that indicate the location of the tracking device before, or at, entering of the sleep state. While in a sleep state, the tracking device may emit a low power beacon, which may be emitted in different formats at different transmission of the beacon. The different beacons may be emitted according to a configured pattern.

20 Claims, 4 Drawing Sheets

AUTOMATICALLY CHANGING MESSAGE TRANSMISSION MODES IN A TRACKING DEVICE

CROSS REFERENCE TO RELATED APPLICATIONS

This application claims priority under 35 U.S.C. 119(e) to U.S. provisional patent application No. 63/289,095 entitled "Automatically changing message transmission modes in a tracking device," which was filed Dec. 13, 2021, and which is incorporated herein by reference in its entirety.

FIELD

The present invention relates to tracking devices, and more particularly to extending battery life of a tracking device.

BACKGROUND

Wireless communications devices serve many purposes in today's connected world. In addition to providing communication between people using such devices, wireless communications devices may use sensors to provide information regarding the environment surrounding the device to a user. Such information may be provided wirelessly to another wireless communication devices, such as a user equipment device ("UE"). Examples of user equipment devices include smart phones, tablets, smart watches, and the like. Information that may be provided to a UE includes the location of the device that is providing the information.

A device may use myriad means and methods for determining its location, such as GPS and triangulation between cellular towers or triangulation between Wi-Fi hot spots. Typically a tracking device periodically transmits a location message. The location message may include identification information that uniquely identifies the tracking device, either uniquely with respect to all other tracking devices (i.e., and IMSI or MAC identifier), or the information may uniquely identify the tracking device among one or more tracking devices that are monitored by an individual or an entity that tracks many items to which tracking devices are affixed. Tracking messages may be encrypted so that only devices that receive the tracking message either directly, or indirectly from an intermediate device such as a tracking device management server coupled to a communication network, can decrypt the tracking message to obtain the location of the tracking device(s) and thus the location(s) of item(s) or person(s) to which the device(s) is/are affixed and correspond to.

Since tracking devices by their nature are typically meant to be mobile because a purpose of a tracking device is to unobtrusively monitor the whereabouts of a movable object or person, tracking devices are typically made as small as possible and thus use small batteries. Extending the battery life of a tracking device is a desirable achievement.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method, comprises periodically monitoring, by a tracking device comprising a processor, a signal value, such as a battery voltage of a battery of the tracking device or a signal strength of a long-range wireless network signal, received from a sensor of the tracking device. The method may further comprise analyzing the signal value, such as a battery voltage or signal strength, with respect to a tracking device parameter criterion corresponding to the monitored signal value to result in an analyzed signal value (e.g., the monitored battery voltage is compared to a battery voltage criterion or a signals strength is compared to a configured minimum signal strength criterion); and based on the analyzed signal value being determined not to satisfy the tracking device parameter criterion (e.g., the monitored battery voltage falls below the configure voltage criterion, or threshold or monitored signal strength falls below the configured signal strength criterion), causing the tracking device to transmit at least one tracking message via a short-range wireless signal, which may be a beacon signal, or other short range radio signal, wherein the at least one tracking message comprises a payload formatted according to one of at least one configured tracking message formats. The formats may be different formats and may correspond to different types of tracking device, different brands of tracking devices, different tracking software revisions/versions, and the like.

In an embodiment, a first tracking message of the at least one tracking message may have a payload formatted according to a first format and a second tracking message of the at least one tracking message may have a payload formatted according to a second format.

In an embodiment, the first tracking message and the second tracking message are transmitted according to a tracking message distribution scheme. The tracking message distribution scheme may be round robin. In an embodiment, the tracking message distribution scheme may be a modified round robin.

The tracking device parameter criterion may correspond to a parameter that is one of: a long-range wireless signal strength value, a light intensity value, a motion, a humidity value, a temperature value, a heart rate, a blood pressure, a timer value, a vibration, a vibration frequency, vibration amplitude, a location coordinate, or a wireless signal from another tracking device.

In another example embodiment, a tracking device may comprise a battery, a long-range wireless transceiver, a short-range wireless circuitry, and a processor. The processor may be configured to monitor, periodically or not periodically, an amount of charge remaining in the battery, a signal strength, or another parameter at a configured monitoring period occasion, according to a configured monitoring periodicity, or according to a configured monitoring schedule that is not periodic. At a monitoring period occasion, or at another configured time, the processor may be configured to determine a charge value, a signal strength value, or value for another monitored parameter, corresponding to each monitoring period occasion or other scheduled time. The processor may be configured to determine whether the charge value, signal strength or other monitored parameter determined at a monitoring period occasion has dropped to a configured battery-saving-mode threshold value, or otherwise doesn't satisfy a configured criterion corresponding to the monitored parameter.

If a determination is made that the monitored charge value, or other monitored parameter, does not satisfy a corresponding configure parameter, the processor may be configured to turn off the long-range wireless transceiver, or cause the entering of a sleep mode by one or more components of the tracking device, when the determined charge value has dropped to the configured battery-saving-mode threshold value (or if a different monitored parameter value does not satisfy a criterion corresponding to the monitored parameter); and cause transmitting of signals by the tracking device using the short-range wireless circuitry until an exit battery-saving-mode command is received. In an embodiment, the processor may be configured to only permit transmitting of signals by the tracking device using the short-range wireless circuitry until an exit battery-saving-mode command is received.

The processor may be further configured to cause the processor to transmit a final-transmission-message signal after the processor determines that the charge value has dropped to the predetermined battery-saving-mode threshold value (or that another monitored parameter does not satisfy a criterion corresponding thereto) using the long-range wireless transceiver before the processor turns off the long-range wireless transceiver due to the determined charge having dropped to or below, the predetermined battery-saving-mode threshold value, or due to another monitored parameter not satisfying a criterion corresponding thereto.

In an embodiment, the short-range wireless circuitry may operate according to a Bluetooth standard or protocol, a Wi-Fi standard or protocol, an RFID standard or protocol, or other short-range wireless standard or protocol. The long-range wireless transceiver may operate according to an LTE CAT-M standard. The long-range wireless transceiver may transmit the final-transmission-message signal according to the LTE CAT-M standard.

In yet another example embodiment, a non-transitory machine-readable medium, may comprise executable instructions that, when executed by a processor of a tracking device, facilitate performance of operations, comprising: monitoring a tracking device parameter of the tracking device to result in a monitored tracking device parameter metric; analyzing the monitored tracking device parameter metric with respect to a tracking device parameter criterion corresponding to the monitored tracking device parameter to result in an analyzed monitored tracking device parameter metric. Based on the analyzed monitored tracking device parameter metric being determined not to satisfy the tracking device parameter criterion, the operations may further comprise causing the tracking device to: transmit a final message; enter a sleep state; and transmit a low-power signal while in the sleep state.

In an embodiment, the final message may comprise a location indication indicative of a location of the tracking device when the final message is transmitted. In an embodiment, the final message may comprise an identifier indicative of the tracking device. In an embodiment, the final message comprises a charge indication indicative of charge of a battery of the tracking device when the final message is transmitted.

The entering of the sleep state may comprise turning off a long-range transceiver of the tracking device.

In an embodiment, the low-power signal may comprise a Bluetooth beacon. In an embodiment, the low-power signal may be transmitted according to different formats at respective different times according to a configured pattern. The configured pattern may comprise round robin, modified round robin. The configured pattern may be based on how recently the lang-range transceiver entered the sleep state. The configured pattern may be based on, configured by, or instructed via a beacon pattern message received from a tracking device management server, which beacon pattern message may comprise, or may be based on, an indication of a relative density of nearby (to the tracking device) user equipment devices, such as smart phones, that are configured to monitor a first low-power signal corresponding to a first type/brand/software version of tracking device and a density of nearby user equipment devices that are configured to monitor a second low-power signal corresponding to a second type, brand, or software version of tracking device. The different formats correspond to different types, brands, or software versions of tracking devices.

BRIEF DESCRIPTION OF THE DRAWINGS

FIG. 1 illustrates a network environment of a user using a tracking device application running on a smartphone to monitor the location of a tracking device.

DETAILED DESCRIPTION OF THE DRAWINGS

Figure 2:
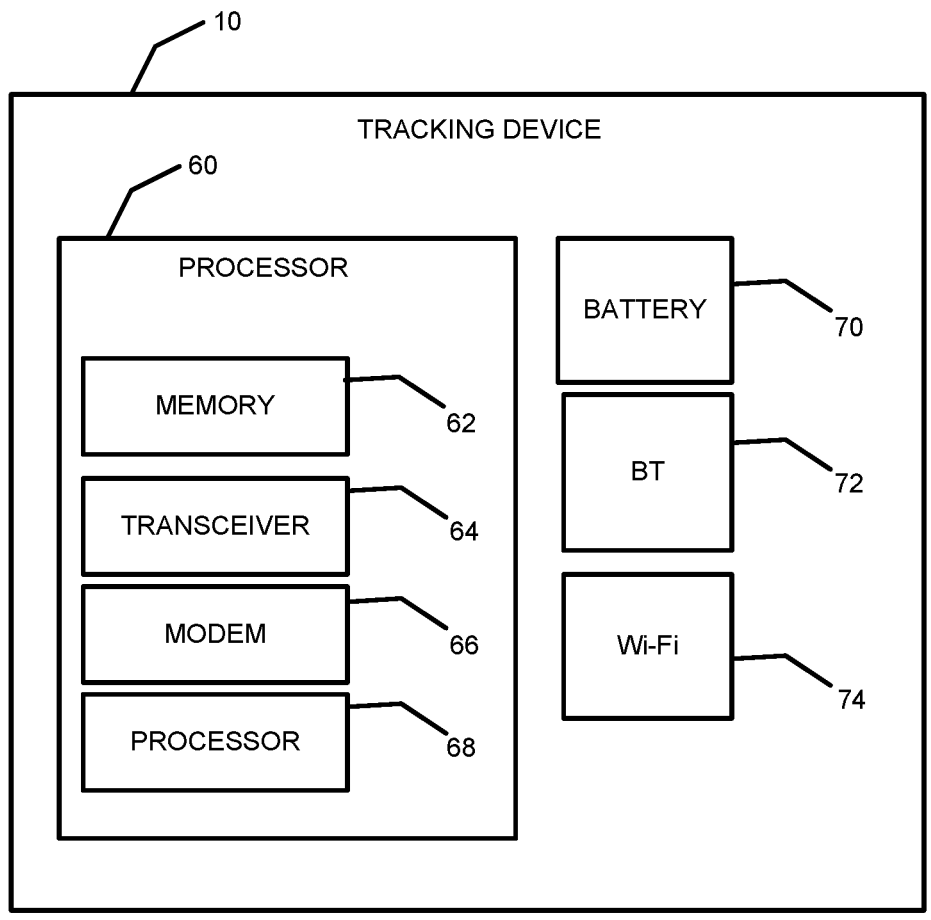
FIG. 2 illustrates a block diagram of a tracking device.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Figure 1:
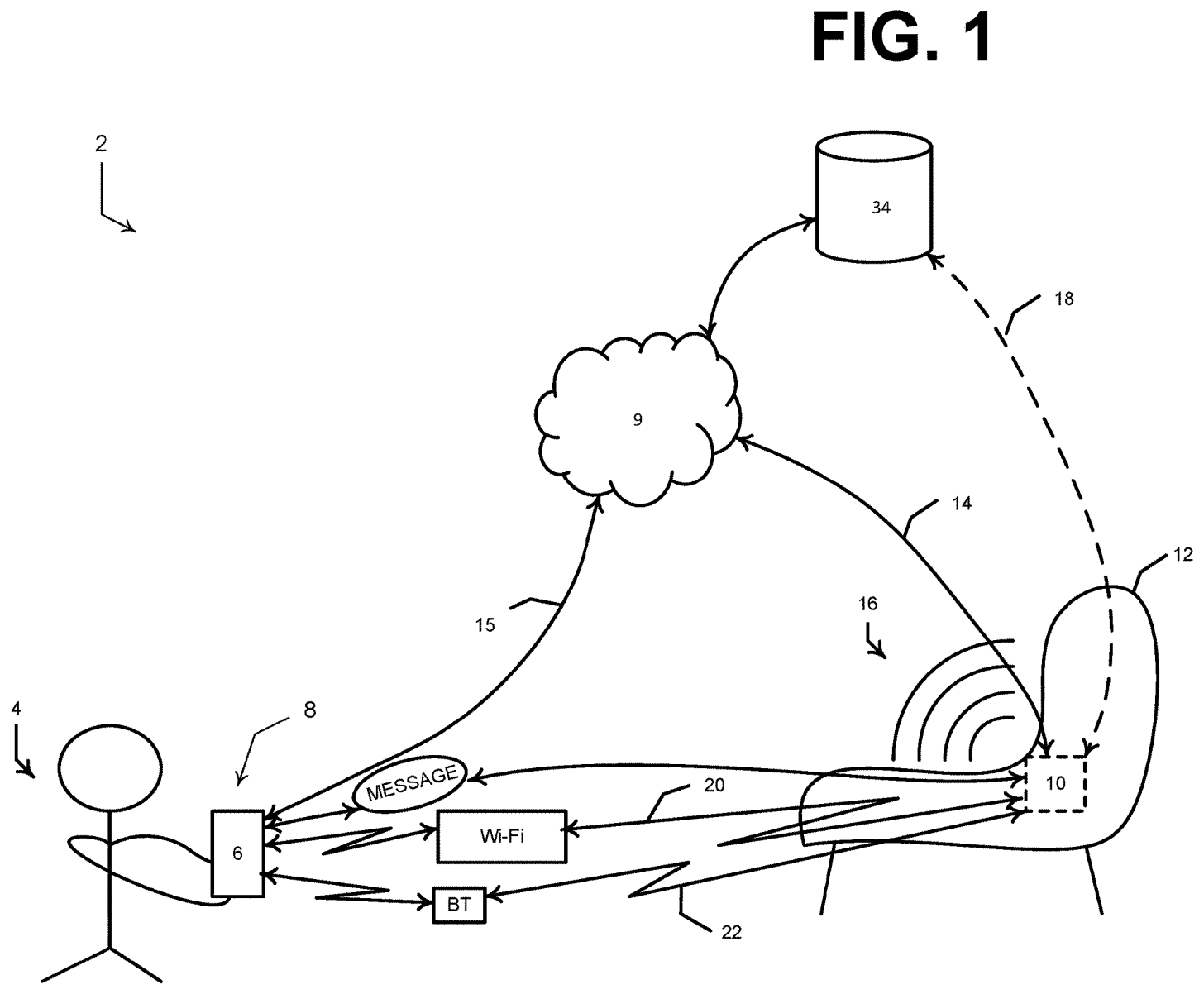

Turning now to the figures, FIG. 1 illustrates an environment 2 where user 4 uses a smartphone application 6 running on a user equipment device ("UE") 8. User application 6 may communicate with tracking device 10. User equipment 8 and tracking device 10 communicate via communications network 9 that may include a long-range wireless communication network such as an LTE network. Communication network 9 may also include the Internet. Tracking device management server 34 may be connected to communication network 9 via a wired internet connection or via a wireless internet connection. UE 8 may communicate with communication network 9 via long-range wireless link 15 and tracking device may communicate with network 9 via long-range wireless link 14. In addition to long-range wireless communication between UE 8 and tracking device 10 the UE may communicate messages with the tracking device 10 directly using one or more short range wireless links, such as Wi-Fi link 20 or Bluetooth link 22. Tracking device 10 May also emit a beacon 16 that is only a transmit beacon that may be detected by UE 8 when the UE is within signal range of tracking device 10. In the scenario shown in environment 2 tracking device 10 is lost in sofa 12; user 4 may attempt to locate the tracking device using tracking application 6 running on UE 8. Communication path 18 is shown with a dashed line to indicate that server 34 may communicate with tracking device 10 even though the tracking device sends message signals to network 9 via link 14 or via UE 8 over links 20 or 22.

Turning now to FIG. 2, the figure illustrates an example block diagram of tracking device 10. Tracking device 10 includes processor 60. In an aspect, processor 60 may be a long-range wireless module, that includes memory portion 62, transceiver portion 64, modem portion 66, and a processor portion, or portions, 68. Processor module 60 may be a single integrated circuit or may comprise one or more discrete components mounted on a circuit board. Tracking device 10 may also include battery 70 and a short range-wireless module, or modules, for example Bluetooth module 72 or Wi-Fi module 74. It will be appreciated that the components may be separate components on a circuit board or may be included in a single integrated circuit chip. Furthermore, one or more of components of processor/module 60 may be combined. For example, modem 66 and microprocessor portion 68 may be combined into a single integrated circuit, with transceiver circuitry, typically radio circuitry, that may be circuitry separate from modem 66 and/or processor portion 68. In addition, memory 62 may be combined in an integrated circuit with components 64, 66, and 68, or may be a separate portion of processor 60. Memory 62 may in some cases not be part of processor 60, but instead may be a component separate from components 64-68 and may be part of tracking device 10 but may not be part of processor.

Figure 3:
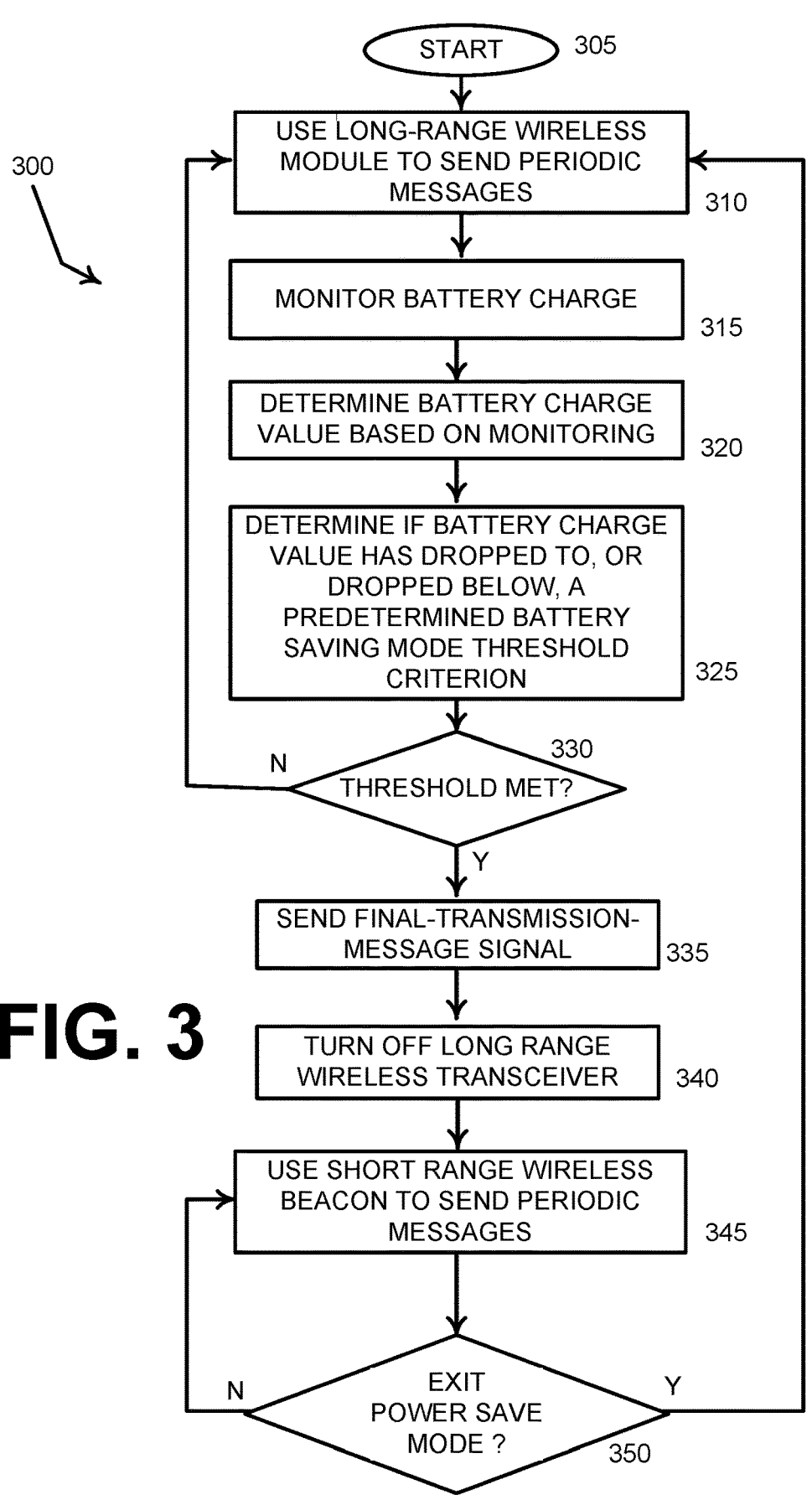
FIG. 3 illustrates a flow diagram of a method to extend batter life of a tracking device.

Turning now to FIG. 3, the figure illustrates a flow diagram of an example embodiment method 300 to extend the life of a battery that powers a tracking device by switching off a long-range transceiver and only sending messages indicating the tracking device's location using a beacon signal such as, for example, a Bluetooth beacon signal. Method 300 begins at act 305. At act 310 a processor of the tracking device uses a long-range wireless module to send periodic messages. The processor that controls the sending of messages may be part of the long-range wireless module, or may be a separate, less sophisticated processor that instructs the long-range wireless module to transmit signals indicating the location of the tracking device, or merely a message that indicates that the tracking is turned on and operating. Periodic messages may include location coordinates of the tracking device and may include other information pertinent to the location or status of the tracking device. At act 315 a processor of the tracking device monitors battery charge by either measuring the voltage of the battery or by measuring some other metric that indicates how much charge is stored in the battery relative to a maximum charge that can be stored in the battery. At act 320 the processor that is controlling operation of the tracking device determines a percentage of charge stored in the battery relative to the maximum charge that the battery can store based on the monitoring that was performed at act 315. In an embodiment, instead of determining a percentage of maximum capacity the battery currently holds, a determination may be made as to how much absolute charge is contained in the battery. The battery's amount of stored charge could be represented by a simple voltage measurement of the battery, or a more sophisticated method can be performed to determine the amount of charge of the battery. In many cases determining a value that represents the percentage of charge stored in a battery of a given tracking device may be sufficient because most tracking devices likely use the same size battery and have similar discharge rates when operating, including sending messages (typically regularly or periodically) via a long-range wireless module. However, it may be advantageous for the processor to use an absolute amount of charge stored in a battery if a larger-than-typical battery is used to power the tracking device. Whereas the processor may determine to shut off the long-range wireless module when a predetermined percent battery capacity criterion, such as a threshold, is satisfied, as will be discussed in detail below in in reference to acts 330-350, if a larger than normal battery is used in a tracking device, a percent capacity threshold that may universally apply for a majority of tracking devices may be too conservative for a tracking device that uses a large size battery. Thus, to avoid complexity in software to accommodate basing a determination for a processor to turn off a tracking device's long-range wireless transceiver on a battery's stored charge being depleted to a predetermined, or configured, percent capacity threshold, basing the decision to turn off the long-range wireless module may be based on a charge amount.

At act 325 the processor determines whether the battery charge value has dropped to or has dropped below a predetermined battery saving mode threshold criterion, or battery minimum charge threshold criterion, for example, as discussed above, the criterion could be 18% capacity. For example, if the determination made at act 320 is that the battery of a tracking device only stores 18% of its maximum capacity the processor of the tracking device may determine to turn off the long-range wireless transceiver. Or, instead of a percent of capacity being the power saving mode threshold criterion the power saving mode threshold criterion, an absolute charge value may be determined at act 320. Or, instead of measuring a charge value of the battery, a number of transmit or receive transactions, which correspond to transmitting or receiving a message, may be counted and the counted number of transactions value may be compared to a predetermined, or configured, transaction threshold value.

Regardless of the battery saving mode threshold criterion, at act 330 the processor determines whether the threshold has been met or satisfied. For example, if the criterion threshold is 18% of maximum battery capacity and measurements made and determined that acts 315 through 320 indicate that the battery is depleted to 18% of its maximum capacity method 300 follows the Y path and advances to act 335. If the determination in act 330 is that the threshold has not been met yet, in other words the battery still contains more charge than the threshold criterion, method 300 returns from act 350 to act 310.

Or, instead of determining whether a predetermined battery threshold value has been met, if long-range wireless signal strength measurement, when analyzed with respect to a configured signal strength criterion, indicates that connectivity to a long-range wireless mobile network has been lost, or is not available, based on the long-range wireless signal strength measurement failing to satisfy the configured signal strength criterion, method 300 may advance to act 335. If the predetermined, or configured, threshold criterion has been met, or satisfied, as determined at act 330, the processor of the tracking device instructs the long-range wireless module to send a final transmission message signal at act 335. The final transmission message signal may include information that indicates the location of the tracking device when act 335 is performed. The final transmission message signal may also include information that indicates that the tracking device is entering a power saving mode and that the long-range wireless transceiver will no longer transmit messages, at least for a configured sleep period during which a processor of the tracking device is turned off or is in a sleep state. The final transmission message may be received by a tracking device management server 34 as described in reference to FIG. 1 or may be received by a UE 8.

Method 300 then advances to act 340 and the processor instructs at least the transceiver portion of the long-range wireless module, and perhaps the entire module, to turn itself off. A tracking device may include more than one processor. A long-range wireless module may include a digital signal processor ("DSP"), which may be referred to as performing modem functionality and which may be coupled to a less powerful, lower-power-consuming processor such as a micro controller unit ("MCU"). When the more powerful, higher-power-consuming processor is turned off, turns itself off, or otherwise enters a power saving mode, which turning off or entering a power saving mode may be performed in response to an instruction message received from another processor, the other processor may continue operating. In an example, the more powerful processor may be a DSP and the other processor may be an MCU. Beginning at act 345, a processor of the tracking device, perhaps a processor of the long-range wireless module or perhaps a less sophisticated processor of the tracking device, continues operating and may cause the tracking device to start transmitting signals using a short-range wireless beacon signal, for example, a Bluetooth beacon signal. Such a beacon signal and the radio circuitry that transmits it typically uses much less power than the long-range wireless module, or a more powerful DSP/modem processor thereof; thus turning off the long-range wireless module, or turning off at least a more powerful, higher-power-consuming processor relative to power consumption of a processor of a Bluetooth module, or Bluetooth circuitry, and using the lower-power-consuming short range wireless beacon signal, such as Bluetooth beacon, extends battery life of a tracking device. At act 350 the processor that is still operating makes a determination whether a command, instruction, or other indication has been received to exit the power saving mode. Such a command/instruction/indication may be generated automatically when the battery is replaced in the tracking device with a fresh battery having full charge. Or, a command may be received from a tracking device management server instructing the tracking device to turn on the long-range wireless module to report the battery health and to report the location of the tracking device. Or, if the power saving mode was entered because of loss of long-range wireless signal at act 330, the processor that is still running may instruct the long-range wireless components, for example a DSP or other processor that consumes more power than a MCU and that is involved in performing modem tasks of the long-range wireless module, to wake up and attempt to connect to the long-range wireless network according to a schedule. For example, the processor that is still operating may instruct the long-range wireless components to wake up and attempt to connect to the long-range wireless network after being in power saving mode for two minutes. If no long-range wireless network can be attached to, or connected to, after two minutes, for example, or some other configured period, the device may re-enter power saving mode for eight minutes, for example. If no network can be attached to, or connected to, during a wake state after the eight-minute power-saving mode, or state, the device may re-enter power saving mode again and then continues the cycle of exiting power saving mode and retrying to connect/attach to a long-range wireless network and then re-entering power saving mode if unsuccessful at increasingly longer intervals such as, for example, thirty-two minutes, then sixty minutes, and then 240 minutes.

If a command to exit power saving mode has not been received at act 350, or if a command to exit power saving mode and remain out of power saving mode because a long-range wireless network was attached to and registered to, method 300 returns to act 345 and continues to send beacon signals periodically using a Bluetooth, or other short-range wireless, beacon signal. If a command is received it act 350 to exit the power saving mode method 300 returns to act 310 and the acts of the method repeat as described above.

Figure 4:
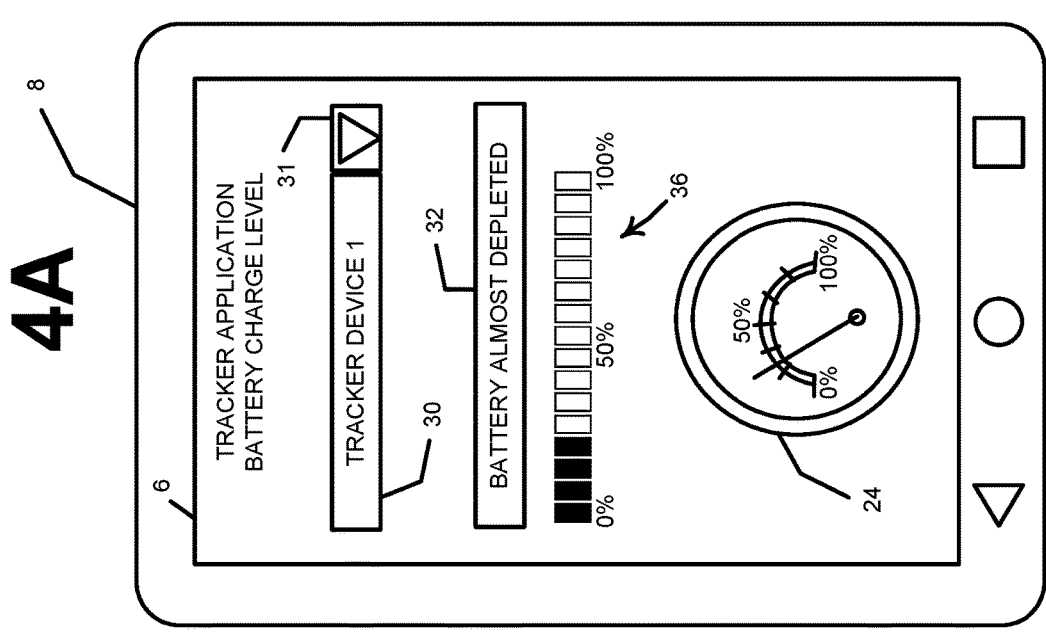
FIG. 4 illustrates a user interface of a tracking device application running on a smartphone that indicates the battery health of a particular tracking device selected by a user.

Turning now to FIG. 4, the figure illustrates a UE 8 with a user interface 6 of a tracking device application showing an indication of charge remaining in a given tracking device, as displayed item 30 of a dropdown box and as selected by control item 31 next to the dropdown box. In message box 32, the user interface 6 informs a user that the battery in tracking device 1 is almost depleted, as shown in analog gauge indication 24 and bar graph indication 36 as shown in FIG. 4A. For purposes of example, in the figure the user interface indicates that tracking device 1 enters battery saving mode and emits a Bluetooth beacon signal when the percent battery charge is about 18%. As shown in FIG. 4A, the needle is above the next to lowest graduation line above the 0% graduation line in analog gage 24. Since there are six graduation lines above the 0% line, each line represents approximately 17%. Each bar in bar graph 36 represents about 7% (each of the fifteen bars above the 0% bar represents about 6.7%) of battery charge, since there are fifteen bars above the 0% bar. Thus, as shown in FIG. 4A, the bar graphs indicates that the battery of tracking device 1 has at least 21% of its full capacity and the needle of analog gage 24, being almost half-way between the 17% and 33%, indicates that the battery of tracking device has more than the minimum threshold criterion of 18%. (Each of the graduation marks of analog gage 24 indicate 16.6%, which would round to 17% for the first mark higher than 0% and 33.25, which rounds to 33%.) Message bar 32 indicates or displays a message informing a user that the battery of tracking device 1 is almost down to its minimum charge threshold criterion.

In FIG. 4B, user interface 6 indicates that the battery of tracking device 1 has reached the minimum charge threshold criterion. The needle of analog gage 24 indicates slightly less than 16.6%, which is less than the minimum charge criterion of 18% battery capacity. Only three bars of bar graph 36 are lit up, including the 0% bar, indicating that the battery only has about 13.4% (f only the 0% bar is lit, then there is no more useful charge remaining in the battery.) Message bar 32 indicates that tracking device 1 has entered battery save mode, or low power mode, which indicates that all of, or portions of, the long-range wireless module of tracking device 1 has been turned off, but that the tracking device continues to transmit a Bluetooth beacon signal that includes an identifier that identifies the beacon transmitter, and thus the tracking device. The signal strength of the beacon may be used to determine the distance of a user's smart phone UE 8. The beacon signal typically does not include location information, such as latitude and longitude coordinates.

The Bluetooth beacon signal may comprise a message generated in different formats. For example, a first message format may be a format similar to a first manufacturer's tracking device message format, for example a format of a message transmitted by a Tile® tracking device. In another example, a second message format may be a format similar to a second manufacturer's tracking device message format, for example a format of a message transmitted by an Apple® tracking device. In another example, a third message format may be a format similar to a third manufacturer's tracking device message format, for example a format of a message transmitted by a Google® tracking device. In another example, a fourth message format may be a format similar to a fourth manufacturer's tracking device message format, for example a format of a message transmitted by a different brand's tracking device than those already mentioned, and so on. The Bluetooth beacon may be used to transmit a message at a predetermined, a determined, or a configured, interval. At each predetermined interval, a beacon message may be a message formatted for a given manufacturer's format. In an alternative embodiment, messages transmitted in a Bluetooth beacon may alternate between two different manufacturer's format, or the formatting of a message may change from one message to the next according to a distribution scheme, such as round robin. In a round robin distribution scheme, a first message may be transmitted with an Apple-formatted message payload, a second message may be transmitted with a message formatted according to a Tile format, and a third message may be transmitted with a message payload formatted according to a Google payload, and then the distribution scheme would begin again with the next message being formatted according to the Apple format and the pattern would continue. Instead of round robin, a different distribution scheme could be followed. For example, instead of a pattern being first message→first format, second message→second format, third message→third format, first message→first format, second message→second format, third message→third format . . . , etc. as in basic round robin, a modified round robin distribution scheme could be used such as for, example, first message→first format, first message→first format, second message→second format, third message→third format, first message→first format, first message→first format, second message→second format, third message→third format . . . , etc. In such a modified round robin scheme, the Bluetooth beacon transmits message with the message formats being weighted 50% in favor of the first format with the other two format being weighted 25% each. It will be appreciated in the modified round robin scheme just described, the first message formats were transmitted one after he other, but the first message format messages could be interleaved with second and third formatted message and still have the same weighting but even out the messaging. Other distribution schemes could be implemented to favor one manufacturer's format over other while still transmitting message formatted in multiple formats. An advantage of distributing messages formatted according to different tracking manufacturers' formats is that multiple types of wireless devices, with different operating systems or tracking applications running on them, that can 'listen for' or detect Bluetooth beacons, such as smartphones, wireless tablets, and other types of wireless UE device, can determine the location of a given tracking device that is transmitting Bluetooth beacon message according to a distribution scheme as discussed above (or some other variation that distributes messages in Bluetooth beacon messages having different message payload formats). Thus, a signal tracking device that uses a distribution scheme to transmit beacon messages of different formats can be detected by more than one brand of, or manufacturer's, UE, or by more than one application running on multiple UE devices, thus expanding the universe of UE devices that can detect, and potentially report to a central location, the location of the single tracking device.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A tracking device, comprising:
   a battery;
   a long-range wireless transceiver;
   short-range wireless circuitry; and
   a processor configured to:
      periodically monitor an amount of charge remaining in the battery at a configured monitoring period occasion;
      determine a charge value corresponding to each monitoring period occasion;
      determine when the charge value determined at a monitoring period occasion has dropped to a configured battery-saving-mode threshold value;
      turn off the long-range wireless transceiver when the determined charge value has dropped to the configured battery-saving-mode threshold value; and
      cause transmitting of signals by the tracking device using the short-range wireless circuitry.

2. The tracking device of claim 1, wherein the processor is further configured to cause the processor to transmit a final-transmission-message, using the long-range wireless transceiver signal, after the processor determines that the charge value has dropped to the predetermined battery-saving-mode threshold value, before the processor turns off the long-range wireless transceiver.

3. The tracking device of claim 2, wherein the final-transmission-message comprises a location indication indicative of a location of the tracking device when the final-transmission-message is transmitted.

4. The tracking device of claim 2, wherein the final-transmission-message comprises a charge indication indicative of the charge value of the battery when the final-transmission-message is transmitted.

5. The tracking device of claim 1, wherein the short-range wireless circuitry operates according to a Bluetooth® standard.

6. The tracking device of claim 5, wherein the long-range wireless transceiver operates according to an LTE CAT-M standard and transmits the final-transmission-message signal according to the LTE CAT-M standard.

7. The tracking device of claim 1, wherein the long-range wireless transceiver operates according to an LTE CAT-M standard.

8. A method, comprising:

monitoring, periodically by a tracking device comprising a battery, a long-range wireless transceiver, short-range wireless circuitry, and a processor, an amount of charge remaining in the battery at least one configured monitoring period occasion;

determining, by the tracking device, a charge value, associated with the battery, corresponding to each of the at least one configured monitoring period occasion to result in at least one determined charge value;

determining, by the tracking device, that at least one of the at least one determined charge value satisfies at least one configured battery-saving-mode criterion;

based on the at least one determined charge value being determined to satisfy the at least one configured batter-saving-mode criterion, de-energizing, by the tracking device, the long-range wireless transceiver; and based on the long-range wireless transceiver being de-energized, causing, by the tracking device, transmitting of signals by the tracking device using the short-range wireless circuitry.

9. The method of claim 8, further comprising:

causing, by the tracking device, transmitting of a final-transmission-message, using the long-range wireless transceiver signal, after the at least one determined charge value is determined to satisfy the at least one configured batter-saving-mode criterion, before the long-range wireless transceiver is de-energized.

10. The tracking device of claim 9, wherein the long-range wireless transceiver operates according to an LTE CAT-M standard and transmits the final-transmission-message according to the LTE CAT-M standard.

11. The tracking device of claim 9, wherein the final-transmission-message comprises a location indication indicative of a location of the tracking device when the final-transmission-message is transmitted.

12. The tracking device of claim 9, wherein the final-transmission-message comprises a charge indication indicative of the at least one determined charge value corresponding to the final-transmission-message being transmitted.

13. The method of claim 8, wherein the short-range wireless circuitry operates according to a Bluetooth® standard.

14. The method of claim 8, wherein the long-range wireless transceiver operates according to an LTE CAT-M standard.

15. A non-transitory machine-readable medium, comprising executable instructions that, when executed by a processor of a tracking device that comprises at least one battery, at least one long-range wireless transceiver, short-range wireless circuitry, and at least one processor, facilitate performance of operations, comprising:

monitoring, periodically, an amount of charge remaining in the at least one battery at least one configured monitoring period occasion;

determining at least one charge value, associated with the at least one battery, corresponding to each of the at least one configured monitoring period occasion to result in at least one determined charge value;

determining that at least one of the at least one determined charge value satisfies at least one configured battery-saving-mode criterion;

based on the at least one determined charge value being determined to satisfy the at least one configured batter-saving-mode criterion, de-energizing, by the tracking device, the at least one long-range wireless transceiver; and based on the at least one long-range wireless transceiver being de-energized, transmitting at least one low-power signal by the tracking device using the short-range wireless circuitry.

16. The non-transitory machine-readable medium of claim 15, wherein the operations further comprise:

transmitting a final-transmission-message, using the long-range wireless transceiver signal, after the at least one determined charge value is determined to satisfy the at least one configured batter-saving-mode criterion, before the at least one long-range wireless transceiver is de-energized.

17. The non-transitory machine-readable medium of claim 16, wherein the final-transmission-message comprises at least one location indication indicative of at least one location corresponding to the tracking device when the final-transmission-message is transmitted.

18. The non-transitory machine-readable medium of claim 16, wherein the final-transmission-message comprises at least one charge indication indicative of at least one charge of the at least one battery when the final-transmission-message is transmitted.

19. The non-transitory machine-readable medium of claim 15, wherein the at least one low-power signal comprises a Bluetooth beacon.

20. The non-transitory machine-readable medium of claim 15, wherein the at least one low-power signal is transmitted according to different formats at respective different times according to a configured pattern, and wherein the different formats correspond to different types of tracking devices.

* * * * *